(12) United States Patent
Simske et al.

(10) Patent No.: US 9,141,900 B2
(45) Date of Patent: Sep. 22, 2015

(54) PROGRESSIVE BARCODE

(75) Inventors: Steven J. Simske, Fort Collins, CO (US); Marie Vans, Fort Collins, CO (US); Helen Balinsky, Cardiff Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/347,303

(22) PCT Filed: Jan. 19, 2012

(86) PCT No.: PCT/US2012/021849
§ 371 (c)(1),
(2), (4) Date: Mar. 26, 2014

(87) PCT Pub. No.: WO2013/109276
PCT Pub. Date: Jul. 25, 2013

(65) Prior Publication Data
US 2014/0339312 A1    Nov. 20, 2014

(51) Int. Cl.
*G06K 19/06* (2006.01)
*G06F 21/60* (2013.01)
*G06K 7/12* (2006.01)

(52) U.S. Cl.
CPC .......... *G06K 19/0614* (2013.01); *G06F 21/602* (2013.01); *G06K 7/12* (2013.01); *G06K 19/06037* (2013.01); *G06K 19/06046* (2013.01)

(58) Field of Classification Search
CPC ................... G06K 19/0614; G06K 19/06037; G06K 19/06046; G06K 7/12; G06F 21/602
See application file for complete search history.

(56) References Cited

U.S. PATENT DOCUMENTS

| | | | |
|---|---|---|---|
| 7,032,823 B2 | 4/2006 | Nojiri | |
| 7,118,041 B2 | 10/2006 | Taylor | |
| 7,702,162 B2 | 4/2010 | Cheong et al. | |
| 2005/0248471 A1 | 11/2005 | Ryu | |
| 2007/0278303 A1 | 12/2007 | Cattrone | |
| 2009/0242649 A1 | 10/2009 | Mizukoshi et al. | |
| 2009/0242650 A1 | 10/2009 | Ushijima et al. | |
| 2009/0323959 A1 | 12/2009 | Hara | |
| 2010/0025472 A1* | 2/2010 | Morgana et al. | 235/462.04 |
| 2010/0097661 A1 | 4/2010 | Hoblit | |
| 2010/0157318 A1 | 6/2010 | Ming | |
| 2010/0282856 A1 | 11/2010 | Bulan et al. | |

* cited by examiner

*Primary Examiner* — Kristy A Haupt
(74) *Attorney, Agent, or Firm* — Pearl, Cohen

(57) ABSTRACT

A method and apparatus for encoding, in a simultaneous multiple security application, independently encrypted security data elements within a single matrix of blocks in a progressive barcode. The method and apparatus including, encoding information of a first data element within the matrix using black modules and, encoding information of a second data element within the matrix using color modules. The barcode being configured to be overprinted as it progresses through progressive states. The progressive barcode, resulting from the overprinting through the progressive states, masking the ability to conclusively determine the barcode in a previous state.

15 Claims, 7 Drawing Sheets

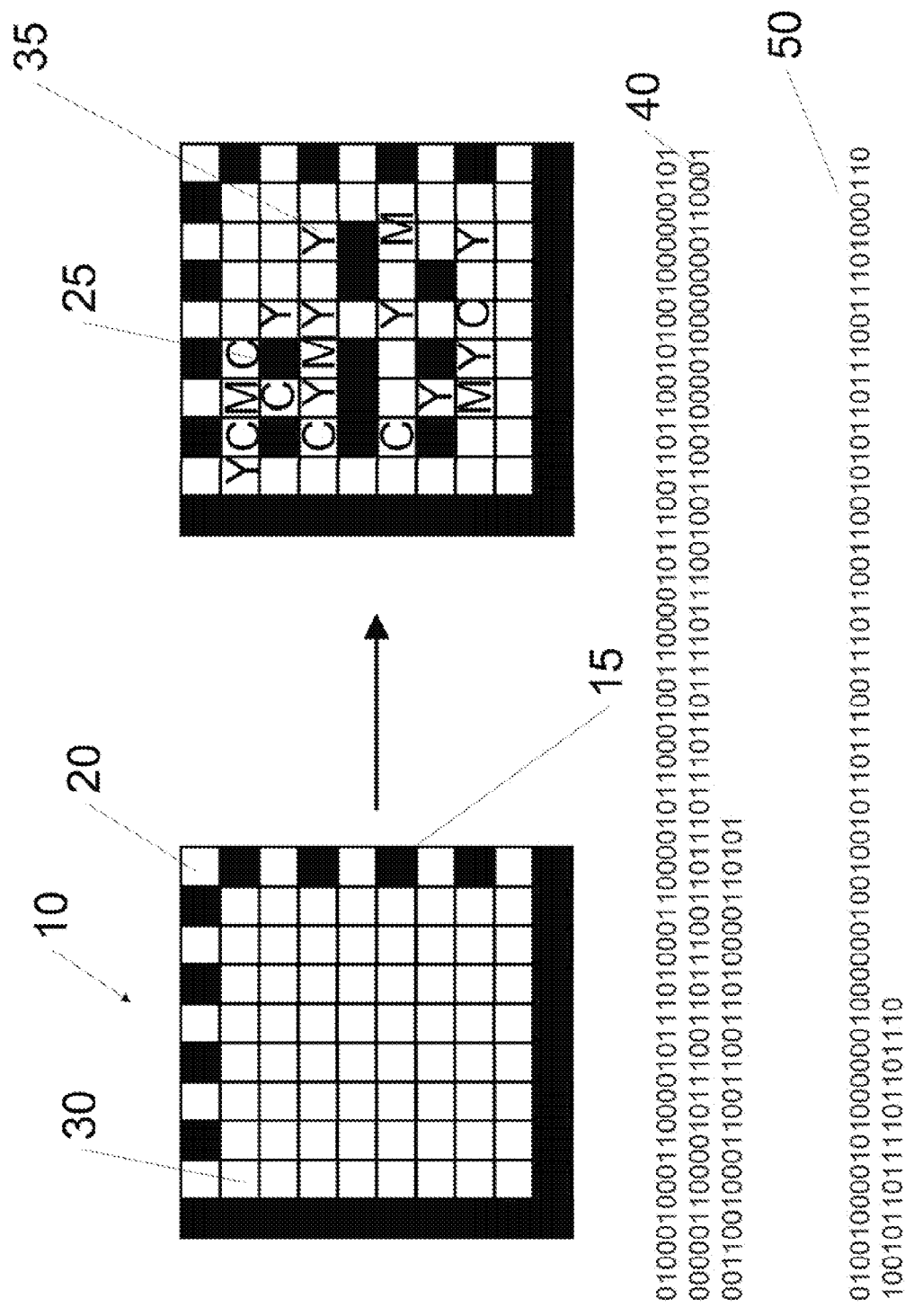

Fig. 2b

PROGRESSIVE BARCODE

BACKGROUND

A barcode is an optical machine-readable representation of data, which encodes the data in a typically visual format, often about the object to which it attaches. Often the data is encrypted. A matrix code, also termed a 2D barcode, is a two-dimensional way to represent information. Similar to a linear barcode, a matrix barcode can represent more data per unit area.

Two dimensional barcodes may be used over a wider range of applications, including, for example, commercial tracking, transport ticketing, product marketing and product labeling.

BRIEF DESCRIPTION OF THE DRAWINGS

The subject matter regarded is particularly pointed out and distinctly claimed in the concluding portion of the specification. Embodiments however, both as to organization and method of operation, together with objects, features, and advantages thereof, may best be understood by reference to the following detailed description when read with the accompanying drawings in which:

FIG. 1 is a schematic illustration of a barcode comprising a matrix of blocks, according to an example.

FIGS. 2a through c are schematic illustrations of some examples of the evolutionary progression of the progressive barcode;

Figure 2A:
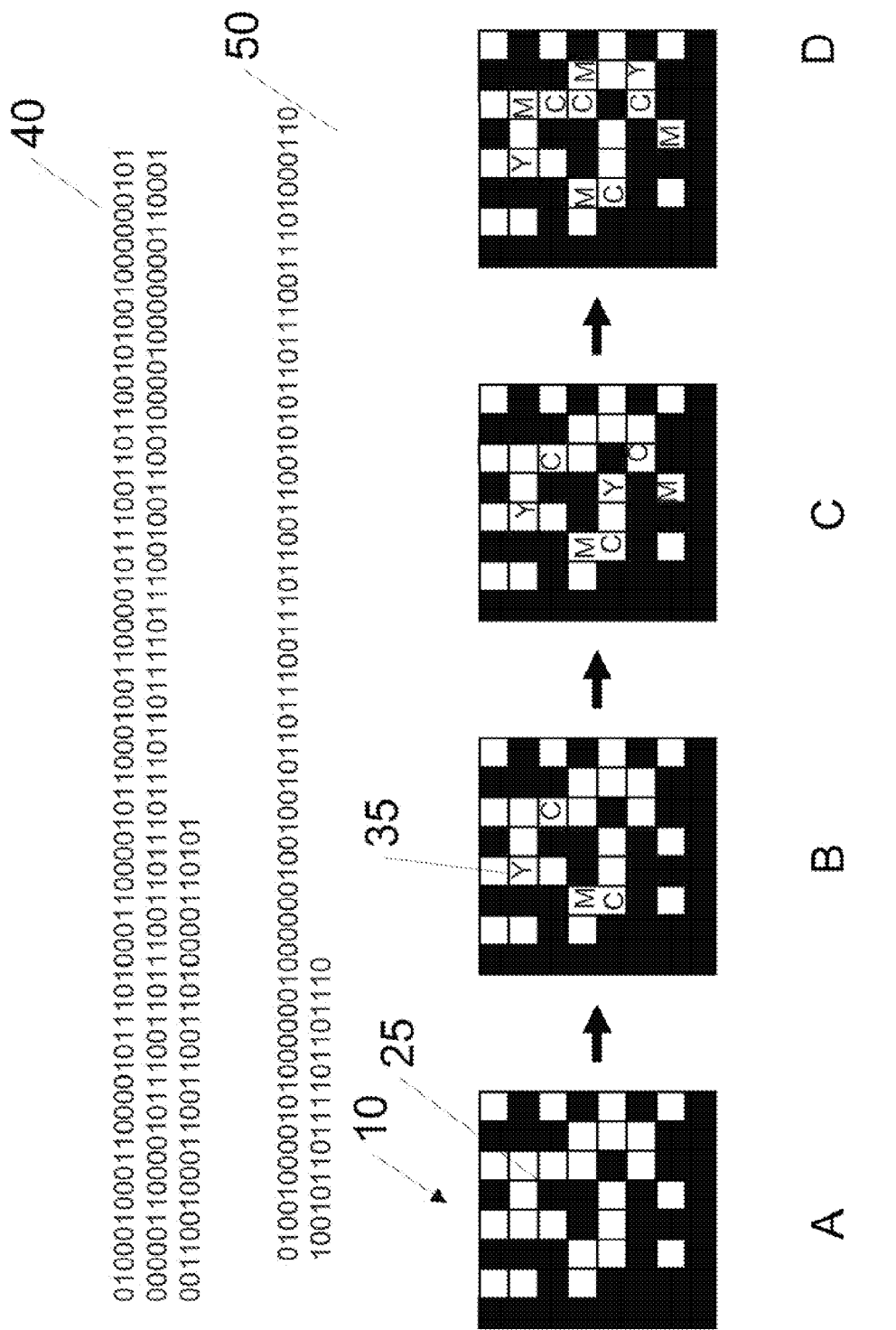

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding. However, it will be understood by those skilled in the art that the examples provided may be practiced without these specific details. In other instances, well-known methods, procedures, and components have not been described in detail.

FIG. 1 is a schematic illustration of a progressive barcode according to are example. Progressive barcode 10 may contain matrix 20. Progressive, barcode 10 may also include non-payload indicia 15 configured to provide data for recognizing and parsing progressive barcode 10. Matrix 20 may contain blocks 30.

In accordance with an example, matrix 20 composed of blocks 30 may be configured to be selectively filled, or is fillable with black modules 25 and/or color modules 35, each module configured to fill an individual block within matrix 20. Typically the black modules, in some examples, read against a background of white, color 25 or unfilled blocks 30, represent one channel of data, the channel of data representing a data element, and the color modules, in some examples, read against a background of black, white or unfilled blocks 30, represent a second channel of data, the channel of data representing a data element. The second channel may be distinct from the first, or in some examples, related to the channel of data represented by the black modules. Typically, in both the first and second channels there may be an explicit assumption about the modules that represent the other channel, i.e., the background modules; for black modules 25, the color modules, white modules, and unfilled blocks 30, and for the color modules 35, the black modules 25, white modules, and unfilled blocks 30. In each of the two channels, both the layout and number of the modules may be varied simultaneously with the corresponding and linked effect on the white tiles and/or unfilled blocks 30.

The number and configuration of the black modules within matrix 20 may represent a data element 40. In some examples, data element 40 may include encrypted data; the encryption may he decrypted by a public security protocol, or public encryption standard e.g. CIPE, SSL, Kerberos (X.509). and other protocols known in the art. Public encryption standards may include DataMatrix, or other standards known in the art. In some examples, the encrypted data element may be decrypted by other methods known in the art.

The color modules are typically colored with colorants, such as, for example, basic colors of a print color space (e.g. Cyan (C), Magenta (M) and Yellow (Y)). Other colorants known in the art may also be used. Typically, the colorants applied to matrix 20 are configured to color individual blocks 30 within matrix 20. In some applications, the colorants may bleed over into a neighboring block. Typically, when progressive barcode 10 is read by a reader, as described below, the reader may typically read blocks with sufficiently unsaturated colors—typically less than 25% of the "darkness" of a black color—e.g. 75% or more saturated. In some examples, the reader may be configured to ignore 1-2 edge pixels at each block boundary when each block is configured to be fillable at 600 pixels per inch, The number and configuration of color modules on the matrix may represent at least a second security-related channel encoding a data element 50. Data element 50 may be encrypted. In some examples data element 50 may not be encrypted.

Typically, black modules 25 may be read with a standard barcode reader, while the color modules are typically saturated such that the cyan, magenta and yellow modules may be "invisible", i.e., unreadable, to the off the shelf commercial barcode reader, and as such may be read simply as white modules. With the first channel of data represented solely by the black modules in the overall field, the color modules may not interfere with the reading of the black modules by the commercial barcode reader, as may be known in the art.

The color modules may be read by a barcode reader configured to read color modules. In some examples, the barcode reader may be configured to ignore black modules. In some examples, the barcode reader may read both the color modules and black modules with the capability to parse out the two separate channels containing the two data elements, as is known in the art. In some examples the data elements are security data elements related to independent, or in some examples, interdependent, security keys for access to secure documents. In some examples the security data elements may be related to a workflow as described below.

In some examples, when reading progressive barcode 10, matrix may be initially scanned or captured with an imager such as a camera or other imagers known in the art. Next matrix 20 may be segmented. Segmentation may involve a single step process or a multiple step process wherein matrix 20 is identified and cropped within the image taken by the imager, and interpreted and/or decoded. Typically, the matrix is then calibrated, in some examples, via an orienting interface. In some examples, calibration includes orienting or dewarping the matrix. Other known calibrations may also be implemented.

In some examples, the non-payload indicia 15 is used to calibrate the barcode reader. In some examples, calibration may be performed in conjunction with the interpretation and/or decoding of matrix 20 as described below.

Typically progressive barcode 10 may be applied to instances of simultaneous multiple security applications, e.g., when one or a plurality of users may obtain separate and/or independent security keys for an application from the same progressive barcode 10. The separate and/or independent security keys typically represented as data element 50 encoded by the layout of color modules 35 and data element 40 encoded by the layout of the black modules 25.

In some examples, the encryption method employed for data element 50 represented by the color modules may be a separate encryption method employed for data element 40 represented by the black modules where white, unfilled blocks 30 and color modules may be configured to be perceived as background. Data element 50 represented by the color modules may be encrypted by progressive hashing or a computationally inexpensive XOR operation which applies a bitwise XOR operator to every character using a given key. In some examples, data element 50, represented by the color modules, may be encrypted by a security (cryptographic) cryptographic protocol incorporating encryption employing a nonce value, e.g., a one-time use random data-string.

In some examples, black modules may be printed onto blocks 30 in matrix 20. Progressive barcodes may be generated by overprinting progressive barcode 20 with black colorant. In some examples, the overprinting results in a subsequent progressive barcode 10, wherein the number and layout of black modules 25 is different, but may be related to, the prior progressive barcode 10.

In some examples, color modules 35 may be further encrypted progressively, so that the prior state of the modules in the matrix would not be conclusively determined by the current state of the color modules in the matrix.

In some examples, color modules may be printed onto blocks 30 in matrix 20 with colorants C, M, or Y. In some examples color modules may be printed with red (R), green (G) or blue (B). In some examples, color modules may be printed with colorants C, Y, R, G or B. Progressive barcode may be generated by overprinting blocks 30 with color modules, the blocks, in some examples, being previously colored in a previous iteration of the progressive matrix. The overprinting typically masks the color of the block that has been overprinted with a different colorant. In some examples, the overprinting of a progressive barcode may not include actually printing one progressive barcode 10 on top of a previous iteration of progressive barcode 10, and may also include generating new image of a progressive barcode that is a function of a previous iteration of the current progressive barcode.

In some examples, the progressive barcode is physically printed. In some examples, progressive barcode 10 is not physically printed, and may be imaged on a computer monitor, or other devices known in the art.

As an example, in the case of overprinting, the overprinting is typically done with colorants cyan magenta, or yellow. Generally, it is not possible to change a block colored yellow to a block colored magenta by overwriting with cyan onto the yellow block. Instead, green would be used in place of magenta, since when physically overprinting, overprinting yellow with cyan produces green. A block with colorant cyan may be overprinted with colorant yellow, typically producing a block colored green. In some examples, a block with colorant magenta may be overprinted with the colorant yellow. Typically, this may produce a block colored red. A block with colorant yellow maybe overprinted with colorant magenta, typically producing a block colored red. In some examples, a block with colored red, blue or green may be overprinted with cyan or magenta or yellow. In some examples, this further overprinting may produce a block colored black. In some examples, when the black modules are configured to be read as a separate readable channel, overprinting a block colored red, blue or green may not progress to black.

In some examples, overprinting of colorant cyan with colorant magenta may produce a block colored blue. Similarly, overprinting block 30, already containing colorant magenta, with colorant cyan may produce a block colored blue. Typically, without knowledge of the first or previous iteration of the progressive barcode 10, it cannot conclusively be determined from the present iteration of progressive barcode 10, the exact layout and coloring of the previous iteration of progressive barcode 10, the iterations of progressive barcode 10 representing a series of progressive barcodes, wherein each progressive barcode in the series is typically related to the other progressive barcodes in the series.

For example, it would not be possible to conclusively determine whether a block colored blue is the result of the overprinting of a block colored cyan with a magenta colorant, or the overprinting of a block colored magenta with a cyan colorant. This inability to conclusively determine the color modules of the preceding iteration of the progressive barcode in a progressive barcode series provides a first or an additional level of security.

Typically, to produce a secure barcode, e.g., to achieve 128 bit security nonce with error-correcting code the matrix may be 20 by 20 blocks or greater.

Typically, the two separately encrypted data elements 40 and 50 within progressive barcode 10 may play multiple security roles. In an example, with two separate module sets (color and black modules) within the progressive barcode 10, a user may be able to add a second secure channel to a readable barcode, the second secure channel typically encoding a data element, without affecting the readability of the initial barcode, or not significantly affecting the readability of the initial barcode. In some examples, with two separate sets of modules, progressive barcode 10 may provide the possibility of two-channel key delivery. Typically, two channel key delivery may allow for the keys to be delivered in different transmission routes, and in some examples, at different times, or with different security requirements.

In an example, a single key shared among a set of users of progressive barcode 10 could be used by any one of the users with a verification or read-only privilege. Further, a full Public Key Infrastructure (PKI) based security approach may be used for read/write access to the progressive barcode 10. In this example, and in other examples, the two module sets may be related to each key independently, affording many different security access methods.

FIG. 2*a* is a schematic illustration of a progressive evolution of a progressive barcode where the color modules change progressively, according to an example. Typically, black modules 25 represent an encrypted string and may be readable by a public standard such as DataMatrix, or other standards known in the art. Color modules 35 may be progressively changed through a progressive hashing or other progressive mechanisms, for example, a nonce XOR, of remaining unwritten modules, or other progression mechanisms known in the art.

The color modules 35 and the black modules 25 progressive barcode 10 may represent two channels encoding independently, or in some examples, not-independently encrypted data elements 40 and 50. The color modules discussed here and further below am represented by the letters C, M and Y in the figure indicating cyan, magenta and yellow, respectively. Each data element may be encrypted using a single or a plurality of distinct, independent or similar security mechanisms.

In some examples, a typical barcode reader will only be configured to read the progressive barcode, so as to decode or read data element 40 encoded with black modules, the number and layout of color modules 35, encoding data element 50, will not affect the readability of data element 40 and would not be read by that barcode reader. In some examples, the progressive barcode may be read by a barcode reader configured to read only color modules; the number and layout of black modules, encoding data element 40, will not affect the readability of data element 50 and would not be read by that reader.

Data element 40 may be encrypted using a standard static encryption method. For example. data element 40, represented by black modules 25 in progressive barcode 10 do not change over the progressive states of the barcode, the progression through the states indicated by the arrows. The states may represent states in workflow as described below.

These black modules, the white or non-filled blocks 30, and typically colored modules 35 that may be interpreted as white, by barcode readers, as described above, may in some examples, indicate, for example, static information, such as information relating to the product, location, or other pieces of information, and may be readable by a public standard such as DataMatrix and decoded via a barcode reader.

Data element 50 may be encrypted progressively, and may be changed from a first stage to a next stage through a progressive hashing or other encryption mechanism known in the art.

Data element 50 may be represented by color modules 35, the specific number and layout of color modules 35 in a subsequent iteration of progressive barcode 10, the iteration typically representing a state in a workflow, may be related to the number and layout of color modules 35 in a previous iteration of progressive barcode 10. The iterations of progressive barcode 10 represented by states A through D for illustrative purposes.

For example, the specific number and layout of color modules 35 in state B may be related to a number and layout of color modules in state A by a mathematical relation. In some examples, the number and layout of color modules 35 in state B may be related to the number layout color modules in state A by other relations known in the art. The progression of the color modules in progressive states, e.g., A through D may, in some examples, be used to provide additional information regarding a workflow, the progression through the workflow as depicted by the arrows.

As described herein, a workflow is a defined set of stages, usually with tasks at each stage, through which a product may pass during its lifecycle. In an example, the workflow is a process during which documents, information, tasks, or products are passed from one participant to another for action or informative purposes, according to a set of procedural rules.

Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time in a stage, and the like. Thus, a workflow may be defined as a set of tasks associated with generating, implementing, producing, or distributing a product. In addition, a workflow may be conditional. In other words, a workflow may progress to different possible stages depending on the desired progression for each individual case.

As a product passes through a workflow, data regarding the product may remain constant, and encoded in a first data channel on the barcode, and incremental data may be added progressively to the barcode in a second channel such that data regarding stages in the workflow, or changes in the workflow, are recorded, and may thus be monitored and verified.

In some examples, the incremental information may be added to the progressive barcode 10 along progressive iterations of the progressive barcode. In some examples, progressive barcode 10 may be applied to simultaneous multiple security applications. In some examples, data encoding progressive iterations may be encoded along the workflow, this data may include information that may be useful for tracing, tracking, state indication, data embedding, authentication, identification, or any other operations that may be used to provide information as a product progresses through the stages of a workflow.

In some examples, the workflow may initially involve three stages, for example, a manufacturer, a distributor, and a retailer. At each stage, the workflow may require an individual to sign a document, such as by overprinting the barcode or associated with the product, prior to shipping the product and document to the next entity, and may require an individual on the receiving end to sign the document upon receiving the product and document.

Further, the two data elements regarding the product may be encoded via two separate security mechanisms. The separate security mechanisms may, in some examples, allow for two different methods of providing decryption keys; for example, a public key infrastructure (PKI) for one key and an identity-based encryption (IBE) mechanism for the other, i.e., a two channel key delivery system.

Figure 2B:
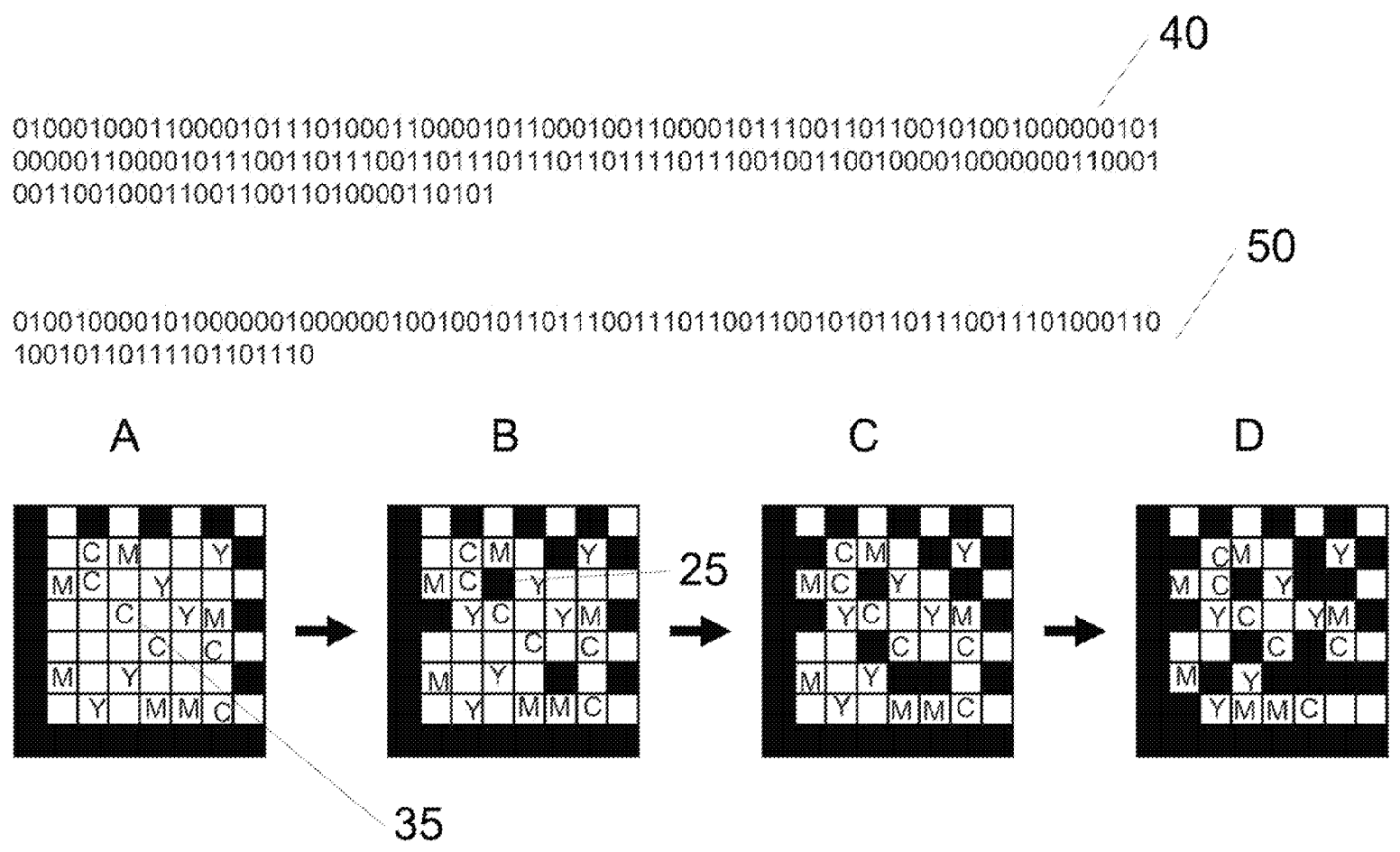

FIG. 2b is a schematic illustration of a progressive barcode, with progressively changing black modules, according to an example.

The color modules 35 may represent a binary string or other data element. The binary string may provide a key for accessing a database.

In some examples, the binary string may be encrypted to represent static security information. Typically, black modules 25 may evolve, e.g., may be progressively modified, as an associated digital signature of the color modules 35 in the progressive barcode 10.

According to this example, two or more distinct security approaches may be provided within the progressive barcode, e.g., progressive barcode 10 it can represent, in one barcode, two or more independent or largely independent binary strings, each of which may be used for a specific security application (e.g. authorization, authentication, signing, etc.) in some examples, color modules 35 may represent an encrypted, typically static, string, readable by a 2D barcode reader, or other readers known in the art, the number, color and location of the color modules may not change throughout the progression of different iterations of the progressive barcode 10 through different states. Typically the different states, depicted as A through are along a workflow, the progression through the states and the workflow as represented by the arrows.

In some examples, the color modules may represent a cryptographic key—e.g. a temporary password, to a database with separately messaged username or access right. The intended recipient of progressive barcode 10 may have a username or username/(permanent) password sign-on. The color modules may represent an access password to a specific, otherwise-forbidden, asset.

In some examples, the black modules 25 in matrix 20 may vary as a chained digital signature or other form of digital signature of color modules 35 in matrix 20, typically, so that a creator of color modules 35 in progressive barcode 10 can be validated.

Typically the layout of the black modules progresses through the progressing states of the workflow. The number and location of the black modules in state A are typically different than the number and location of the black modules in State B. Typically the number and location of the black modules in state A are related to the number and location of the black modules in State B.

Figure 2C:
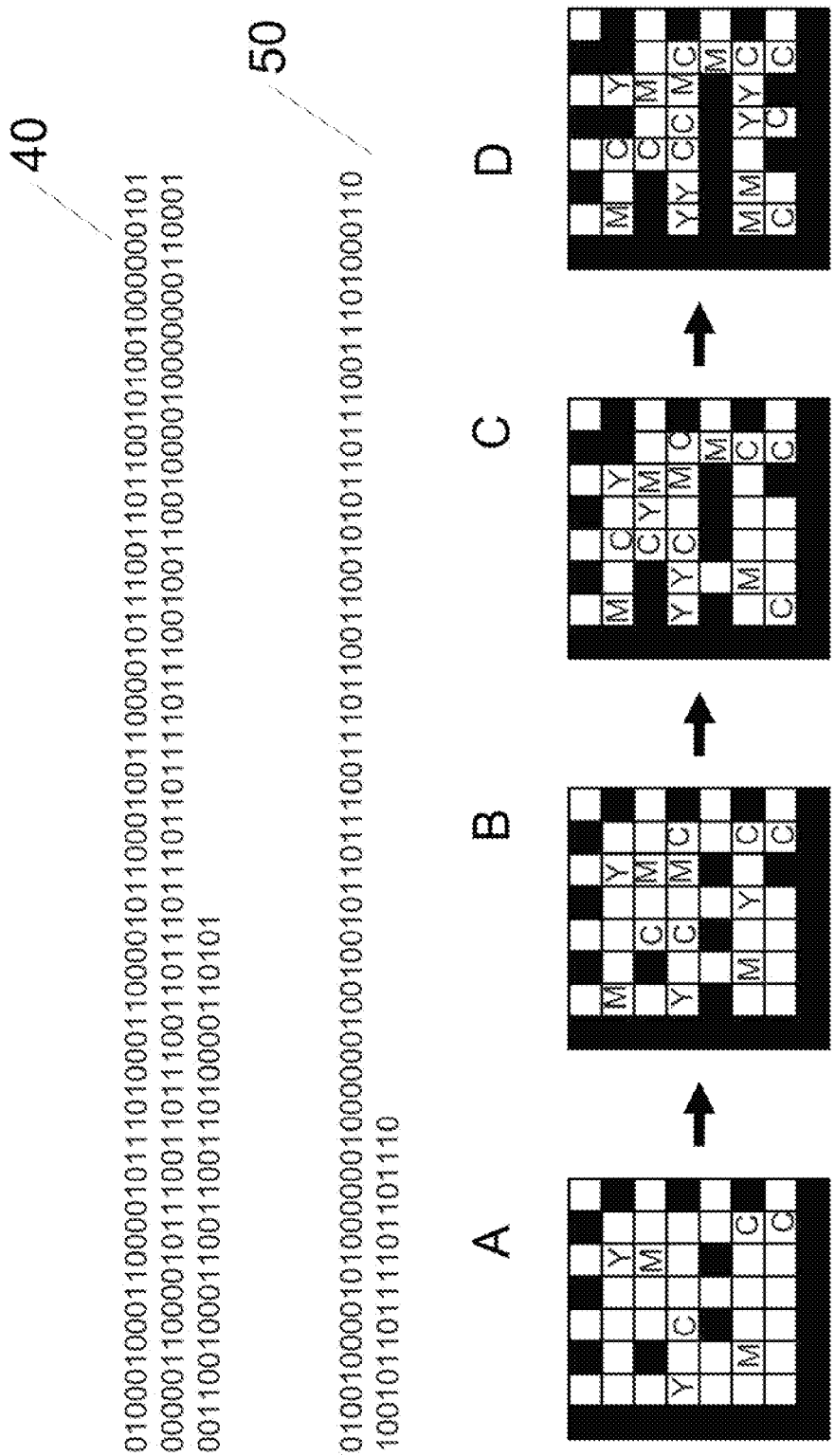

FIG. 2c is a schematic illustration of an evolutionary progression of the color and black modules in progressive barcode 10. Both color modules 35 and black modules 25 may vary, e.g., may be progressively modified, by the same or different security mechanism. In some examples, both the color modules 3 and color modules 25 may progress, e.g., may be progressively modified, along a workflow with independent security methods, for example nonces, hashing/digest, signatures, multiple encryptions, or other security methods known in the art.

For example, color modules 35 may represent a non-static binary data element encoded using a security mechanism wherein there may be a series of progressive sets of color modules represented in progressive states of progressive barcode 10, depicted as A through D.

Both the color 35 and black 25 modules may progress, i.e., neither static. The color modules here may use a simple security mechanism, wherein the present layout of the color modules in the present progressive barcode, e.g., B is a function of the layout of the color modules in the previous progressive barcode, e.g., state A.

Black modules 25 may represent a hashing of the previous number and/or layout of black modules that, in some examples, could be operated on by an XOR with a nonce, private key or other security key, thereby affording higher security.

In some examples, one or a plurality of sections of the barcode may be configured to provide different levels of user rights for different users in the workflow. For example, a section of the barcode may be configured to be used as a nonce to be XOR operated on an access table for other content within the workflow or a database related to the workflow.

In some examples, the color modules may be read by any user in a workflow, and the latter set of black modules may be read by only a user with a higher security clearance.

For example, wherein a first state A of the progressive barcode 10 has a first set of color modules 35 encoding a binary data element 50, the set representing the umber and layout of color modules 50, and wherein the next state B of progressive barcode 10 includes a set of color modules 35 that may be a function of the set of color modules in previous state A of progressive barcode 10.

Progressive barcode 10 may also have a series of progressive sets of black modules 25 in matrix 20, the set representing the number and layout of black modules 25 in matrix 20.

A second state B may contain a set of black modules that may represent a hashing of the set black modules 25 from the previous state A of matrix. 20.

In some examples, the set of black nodules 25 in subsequent states, B through D may be an encrypted binary string or other data element, the encryption the result of an XOR operation performed with a nonce. In some examples, the encryption of the black modules 25 in each of the states of A through D may be encrypted via a private key or other security string known in the art.

In some examples, the set of black modules 25 in state A may be encrypted by a security protocol that might allow the original binary string, or other data element to be read by any user. The set of black modules 25 in subsequent states B through D may be encrypted such that only a user with a particular security clearance can decrypt the modules to determine their unencrypted initial binary data element.

The progression through the states and/or the workflow is as indicated by the arrows.

In some examples, the higher security channel may be used to enable a mapfile entry in a Publicly-Posted Composite Document (PPC) file only for the user with the correct security access, providing a mechanism for providing and enforcing differential access control for publicly-posted composite documents. Typically, a mapfile may be a table in a database containing one or a plurality of security keys or nonces that are needed for decrypting the appropriate parts of a composite document to which a user has access rights.

Typically, these Multi-part composite documents may be created and managed in complex workflows, with participants including external consultants, partners and customers distributed across the globe, with many no longer contained within one monolithic secure environment. In some examples, these documents, distributed over non-secure channels, carry different types of sensitive information requiring multiple workflow participants with different access levels to contribute to the document. The various participants of a workflow may be granted varying levels of access to the various units.

For example, levels of access may include no access "read access", or "modify access". A single unit of the document may be associated with different sets of access keys. For example, such keys may include a verification key, an encryption key, a decryption key, and a signature key. Access keys for the unit are distributed to each workflow participant based on that participant's level of access. For example, a participant with "no access" level may be provided with only the verification key for verifying a signature attached to the document A participant with "read access" may be provided with both the verification key and the decryption key, to enable access to the contents of the document. A participant with "modify access" may be provided with all of the aforementioned keys, to enable re-encryption and signing of the modified document. This differential access may be accomplished via the progressive barcode 10.

In an example, progressive barcode 10 and its particular state (A, B, C, or D) provide a mandatory piece, for example a token or Barcode Token (BT) derived from progressive barcode 10, required to access the PPCD. Until such a token is recovered or computed or derived out of the corresponding channel in the barcode and its state, the PPCD cannot be accessed. Various accesses to PPCD can be locked. For example, the PPCD contents can be rendered fully or partially inaccessible, i.e., some content-parts may still be accessible, whilst others are not until the corresponding token is available.

To render some content inaccessible, parts within the PPCD document may be encrypted, operated on by XOR with a secure string, or other forms of encryption using the BT; alternatively, the corresponding entries within corresponding map-files can be encrypted, operated on by an XOR operator with a secure string, or other forms of encryption using the BT. To render the PPCD inaccessible to one, several or all of the workflow participants or users, corresponding map-files of the participants (whose access requires a valid BT may be encrypted by an XOR operator with a secure string or other forms of encryption using the BT) may be made recoverable only in the presence of the valid BT.

Alternatively, a corresponding entry within a fast filtration entry table (e.g., "entryTable" in the PPCD serialization) may be completely or partially encrypted by XOR with a secure string or other forms of encryption, using the BT. Inability to decrypt their entry in the entryTable may prevent the participant from accessing their map-file decryption key (stored in his entry in the entryTable) and may prevent the participant from accessing the document.

This example may allow for the connection of a physical barcode to access rights in an electronic workflow, and may prevent the file from being unlocked until progressive barcode 10 is read, for example color modules 35 of the barcode may be decoded and an XOR operation must be performed with the appropriate key delivered to the user for accessing the document.

The aforementioned example may also include separate data channels encoded into progressive barcode 10 from each of the two types of modules—black 25 and color modules 35, each data channel progressing independently, or in some examples, dependently along the workflow, with independent, or in sonic examples, dependent security methods employed.

In this and other examples, the progressive barcode may both contain incremental information added during its progression, and may also provide separate threads of data with potentially widely-different security/access, thereby allowing for a staggered clientele of users.

Further, this and other examples, may also allow the progressive barcode 10 to be used to help unlock a differently-accessed composite document posted on a public share. This allows the progressive barcode to both contain incremental information during its progression, and also provide separate "threads" with potentially widely-different security/access, thereby allowing a staggered clientele of users. It also allows the barcode to be used.

Figure 3:
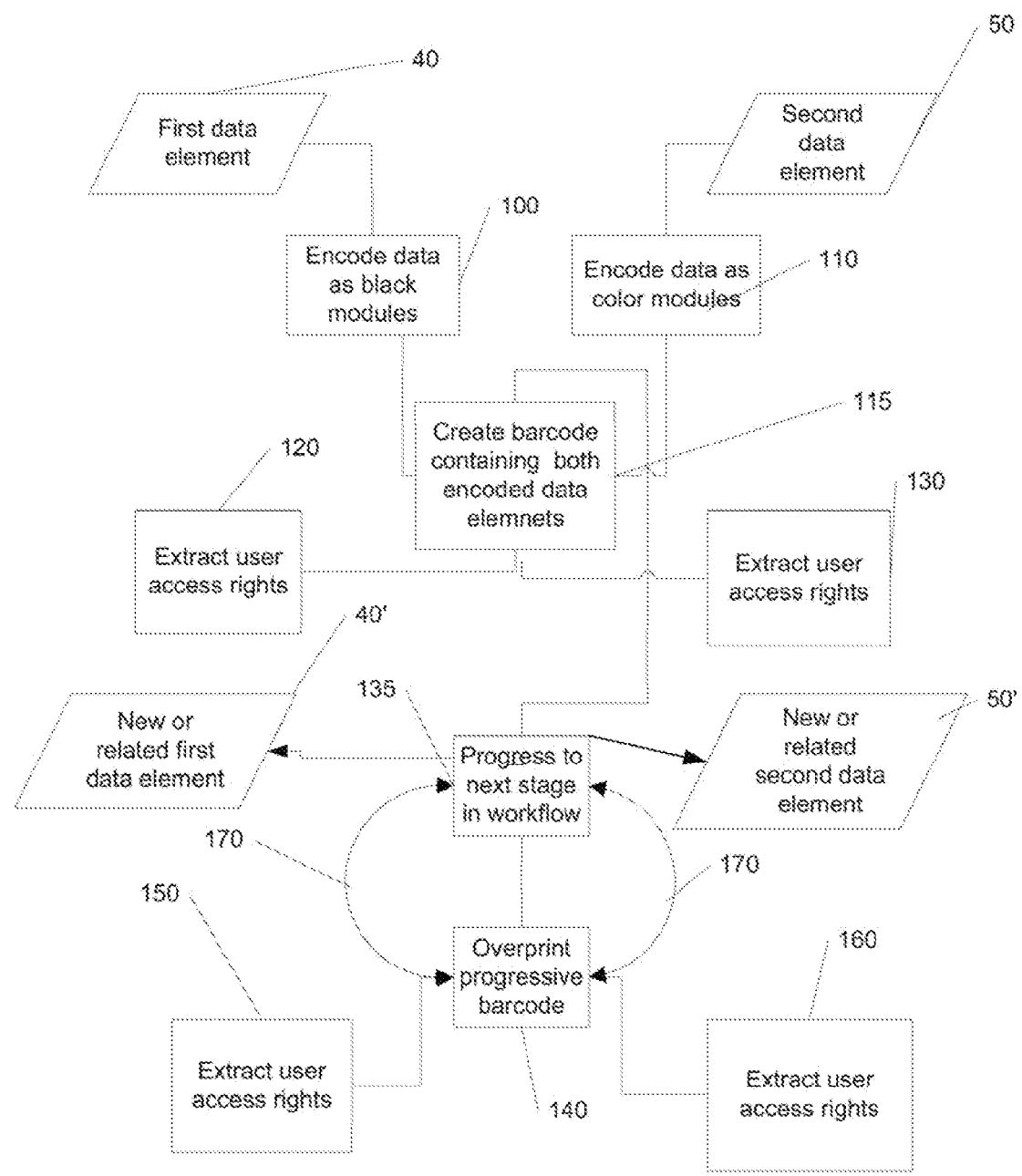
FIG. 3 is a flowchart illustrating an example of a method of the evolutionary progression of a progressive barcode.

FIG. 3 is a schematic flowchart of an example of the evolutionary progression of a progressive barcode. Typically independently encrypted data elements may be encoded within matrix 20 of blocks 30 in progressive barcode 10. A first data element, depicted as diamond 40 may be encoded within progressive barcode 10 using black modules 25, and referenced with respect to both white, non-filled blocks and/or color nodules that may be typically read by a barcode reader as the equivalent of a white non-filled block, as described above and as depicted by block 100. A second data element, depicted by diamond 50 may be encoded in progressive barcode 10 using color modules 35 as depicted by block 110.

The barcode is an amalgamation of the two encoded data elements, as depicted by block 115.

In some examples, progressive barcode 10 may be configured to provide different levels of user rights for different users in a workflow, as depicted by blocks 120 and 130, wherein block 120 represents a group of users with a particular level of users rights, and wherein block 130 represents a different, and in some examples, overlapping, group of users with a particular level of user rights. A user with requisite security clearance will be able to extract user rights commensurate with their user level from the progressive barcode. Typically, this split in users and rights may occur when one group cannot decode the data encoded by one module set, the module set representing, the number and layout of one type of module (e.g., color or black), and may have the capability to decode the data encoded by the other module set. In some applications, some users may have the capability to decode the data encoded by either set of modules.

Typically, as a workflow progresses to a second stage, as depicted by block 135, progressive barcode 10 may be overprinted, ire some examples, with a new data element, as depicted by diamond 50', encoded by color modules 35, and in some examples, with a new data element, as depicted by diamond 40', encoded by black modules 25. The overprinting configured such that data element 50, as encoded in a first stage by a module set, cannot be conclusively determined by the overprinted module set; the overprinted module set, representing data element 50' masking some or all of the prior module set representing data element 50.

The new progressive barcode, as a result of the overprinting, is depicted by block 140. The new progressive barcode, like the previous barcode in the prior stage, depicted by block 115, may provide for distinct or overlapping user rights for two or more distinct or related groups of users along a workflow. The users depicted by blocks 150 and 160. In some examples, the users and their rights are distinct from the users and their rights depicted by blocks 120 and 130. In some examples they are the same. In some example the users and their rights overlap.

In some examples, there are additional stages to the work am where one or a plurality of data elements are encoded by at least one module set in the progressive barcode. And wherein, the encoded data may be overprinted onto the prior barcode, the overprinting, typically configured such that the prior stage of the progression of the barcode through the workflow cannot be conclusively determined. The additional iterative stages represented by arrows 170.

In some examples, progressive barcode 10 may be configured to provide different levels of user rights for different users in a second stage of the workflow, as depicted by blocks 150 and 160, wherein block 150 represents a group of users with a particular level of users rights, and wherein block 160 represents a different, and in some examples, overlapping, group of users with a particular level of user rights.

Figure 4:
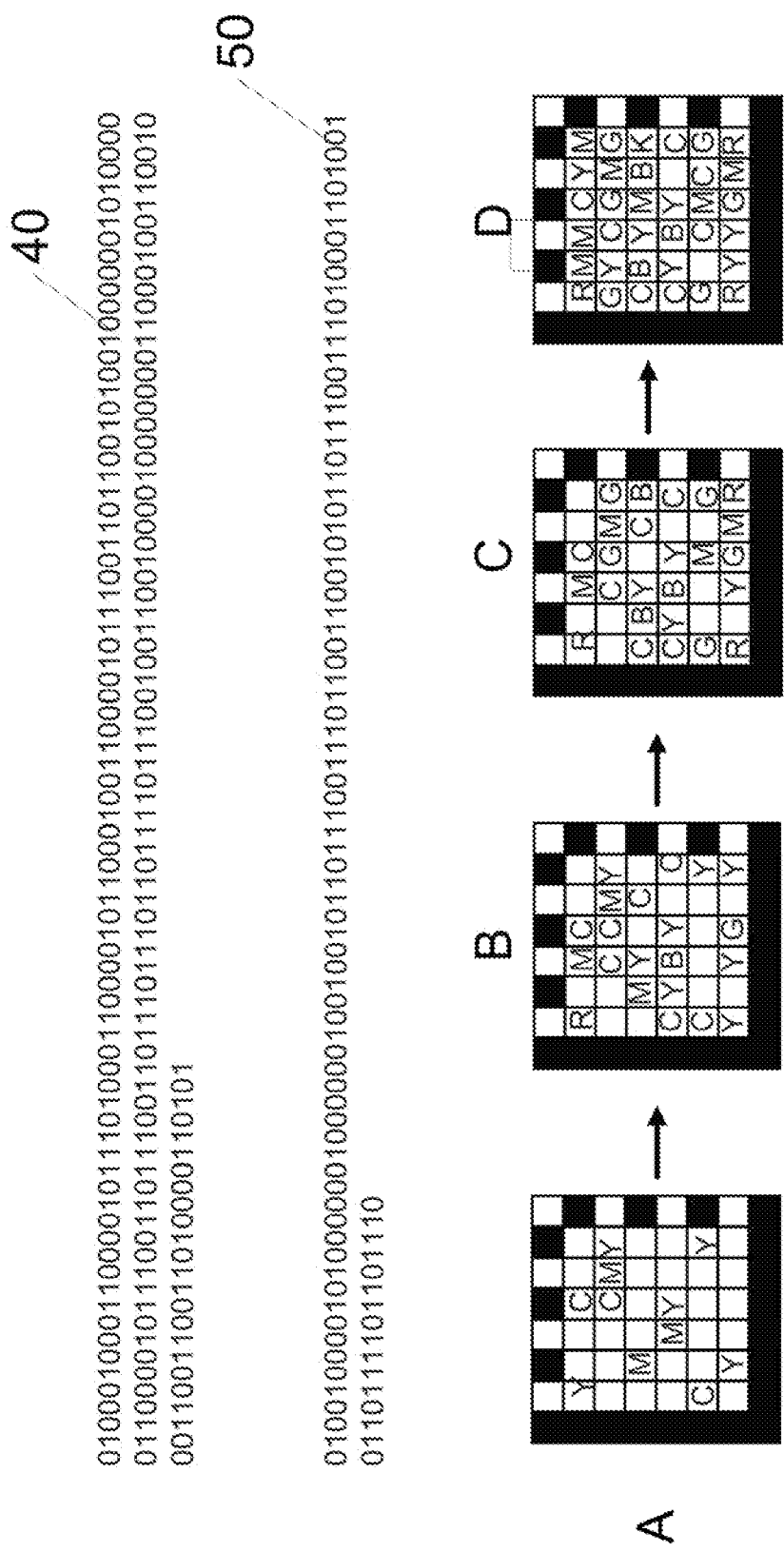
FIG. 4 is a schematic illustration of an example of progressively overprinting of a progressive barcode; and, FIG. 5 is a flowchart of method for progressively modifying a barcode, according to an example.

FIG. 4 is a schematic illustration of an example of progressively overprinting of a progressive barcode. As progressive barcode 10 progresses through a workflow, the color modules may be overprinted as described above, the overprinting resulting, in some examples, in the addition of additional colors in progressive barcode 10, including red, blue and green (R, B and G) and in some examples, black (K). The umber, layout and evolutionary progression of black modules 25 and color modules 35 in progressive barcode 10, depicted in FIG. 4 is for illustrative purposes, and in some examples, there may be both black modules representing an encoded data element 40 and color modules representing an encoded data element 50.

In an example, color modules 35 are added to progressive iterations of progressive barcode 10, typically representing a progression through a workflow, the progression indicated by the arrows. The changes in the color modules representing changes in the data element encoding the color modules as the barcode and the workflow progress.

Figure 5:
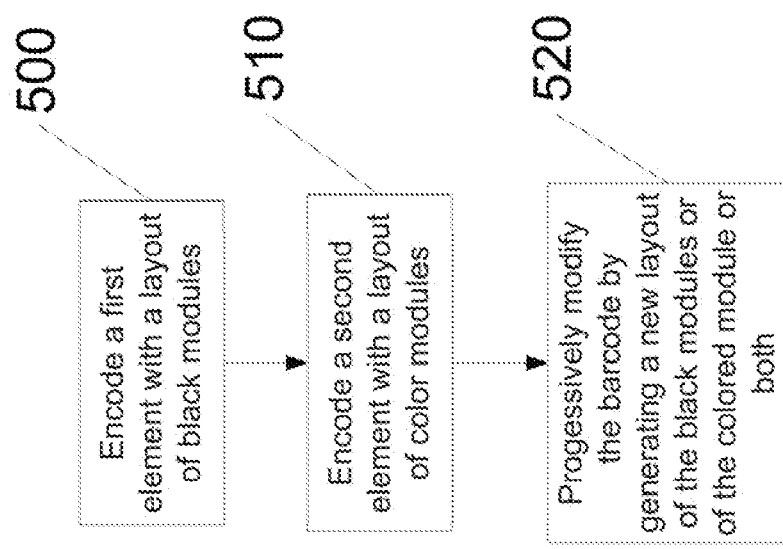

FIG. 5 is a flowchart of a method for progressively modifying a barcode. In an example, independently encrypted data elements are encoded within a barcode. Typically a first data element 40 may be encoded within progressive barcode 10 using a layout of black modules, the black modules typically read against a background of white, unfilled, or colored blocks, as depicted by block 500, and as described above Typically, a second data element may be encoded within progressive barcode 10 using a layout of color modules, as depicted by block 610. The barcode may then be progressively modified by generating a new layout of the black modules or of the colored module or both, wherein the new layout is related to the first data element or second data element or both, as depicted by block 520.

Features of various examples discussed herein may be used with other embodiments discussed herein. The foregoing description of the embodiments of the invention has been presented for the purposes of illustration and description. It is not intended to be exhaustive or to limit an invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method of progressively encoding independently encrypted security data elements within a barcode in a simultaneous multiple security application, the method comprising:
    encoding information of a first data element within the barcode using a layout of black modules and encoding information of a second data element within the barcode using a layout of color modules; and,
    progressively modifying the barcode by generating a new layout of the black modules or of the colored module or both, wherein the new layout is related to the first data element or second data element or both.

2. The method of claim 1, wherein the black modules represent encrypted data and are readable by a public encryption standard, and the color modules are progressively modified through a progressive mechanism.

3. The method of claim 1, wherein the color modules represent a binary string to provide an entry to a database, and the black modules are progressively modified as a chained digital signature.

4. The method of claim 1, wherein both color modules and black modules are progressively modified by a same or different security mechanism.

5. The method of claim 1, wherein both the black and the color modules are progressively modified along a workflow, encoded with independent security methods.

6. The method of claim 1, further overprinting a progressive modification of the second data element, the overprinting configured such that the second data element may not be conclusively determined from the second modified data element.

7. The method of claim 1, wherein one or a plurality of sections of the barcode are configured to provide different levels of user rights for different users in a workflow.

8. The method of claim 7 wherein the one or a plurality of sections of the barcode are configured to be used as a nonce to be XOR operated on an access table.

9. The method of claim 1, further progressively modifying the first data element, to create a modified first data element, either singly or relatedly to the second data element, by adding black modules to the barcode.

10. The method of claim 1, further progressively modifying the second data element, to create a modified second data element, either singly or relatedly to the first data element, by adding color modules to the barcode.

11. The method of claim 9, further comprising progressively modifying the modified first data element, to create a further modified first data element, either singly or relatedly to the second modified data element, by adding black modules to the barcode.

12. The method of claim 10, further progressively modifying the modified second data element, to create a further modified second data element, either singly or relatedly to the first modified data element, by adding color modules, the progressive modification configured such that neither the second data element, nor the second modified data element, may be conclusively determined from the further second modified data element.

13. A system that decodes an overprinted barcode of black and color modules comprising:
    extracting one or a plurality of data elements from a progressively modified barcode having a first data element encoded by black modules and a second data element encoded by color modules, and a new progressive modification layout of the black modules or the color modules or both, the new layout related to the first data element or the second data element or both; and,
    wherein an overprinting masks a prior state of the barcode as encoded by the black modules, the color modules or both.

14. A progressive barcode comprising:
    a matrix of blocks, the blocks configured to be fillable with either color or black modules; the black modules encoding a first data element;
    the color modules encoding a second data element, wherein the first data element is encoded differently than the second data element; and
    wherein the progressive barcode is configured to be progressively modified by generating a new layout of the black modules or of the color module or both, wherein the new layout is related to the first data element or second data element or both.

15. The apparatus of claim 14, wherein the barcode is configured to provide two-channel key delivery by different transmission routes, at different times, with different security requirements.

\* \* \* \* \*

UNITED STATES PATENT AND TRADEMARK OFFICE
CERTIFICATE OF CORRECTION

| | | |
|---|---|---|
| PATENT NO. | : 9,141,900 B2 | Page 1 of 1 |
| APPLICATION NO. | : 14/347303 | |
| DATED | : September 22, 2015 | |
| INVENTOR(S) | : Steven J. Simske et al. | |

It is certified that error appears in the above-identified patent and that said Letters Patent is hereby corrected as shown below:

In the claims,
In column 12, line 47, in Claim 14, delete "and" and insert -- and, --, therefor.

Signed and Sealed this
Twenty-third Day of February, 2016

Michelle K. Lee
*Director of the United States Patent and Trademark Office*